United States Patent
Watanabe

(10) Patent No.: US 7,281,048 B2
(45) Date of Patent: Oct. 9, 2007

(54) METHOD AND SYSTEM FOR TRANSMITTING IMAGE

(75) Inventor: Mikio Watanabe, Asaka (JP)

(73) Assignee: Fujifilm Corporation, Tokyo (JP)

( * ) Notice: Subject to any disclaimer, the term of this patent is extended or adjusted under 35 U.S.C. 154(b) by 759 days.

(21) Appl. No.: 10/055,379

(22) Filed: Jan. 25, 2002

(65) Prior Publication Data

US 2002/0112019 A1    Aug. 15, 2002

(30) Foreign Application Priority Data

Jan. 31, 2001    (JP)    ............... 2001-024289

(51) Int. Cl.
*G06F 15/16*    (2006.01)
*G06K 9/54*    (2006.01)

(52) U.S. Cl. ............ 709/229; 709/206; 382/305

(58) Field of Classification Search ........... 709/203, 709/206, 229, 228, 208; 382/305
See application file for complete search history.

(56) References Cited

U.S. PATENT DOCUMENTS

| | | | |
|---|---|---|---|
| 5,708,826 A * | 1/1998 | Ikeda et al. | 715/501.1 |
| 6,094,219 A | 7/2000 | Roberts et al. | |
| 6,115,739 A * | 9/2000 | Ogawa et al. | 709/215 |
| 6,205,475 B1 * | 3/2001 | Pitts | 709/218 |
| 6,721,802 B1 * | 4/2004 | Wright et al. | 709/246 |
| 6,784,924 B2 * | 8/2004 | Ward et al. | 348/207.1 |
| 7,133,862 B2 * | 11/2006 | Hubert et al. | 707/3 |

FOREIGN PATENT DOCUMENTS

| | | |
|---|---|---|
| EP | 0 889 636 A2 | 1/1999 |
| EP | 0 905 966 A2 | 3/1999 |

* cited by examiner

*Primary Examiner*—Saleh Najjar
*Assistant Examiner*—Kevin Bates
(74) *Attorney, Agent, or Firm*—Birch, Stewart, Kolasch & Birch, LLP

(57) ABSTRACT

When an image is transmitted to a service server from a client computer, an image to be transmitted is selected from a list of images on a display by starting image display programs. Subsequently, a destination service server is selected. The service content of the service server is inquired, and image information is obtained, which is limited by the service server and includes an image size. For example, when an image size of the selected image to be transmitted is larger than the maximum image size limited by the service server, the selected image is subjected to image processing so as to be smaller in size, and then, the image is transmitted to the service server. Thus, even when an image to be uploaded to a service server has an image specification unsuitable for image service of the service server, the image can be automatically transmitted to the service server.

16 Claims, 8 Drawing Sheets

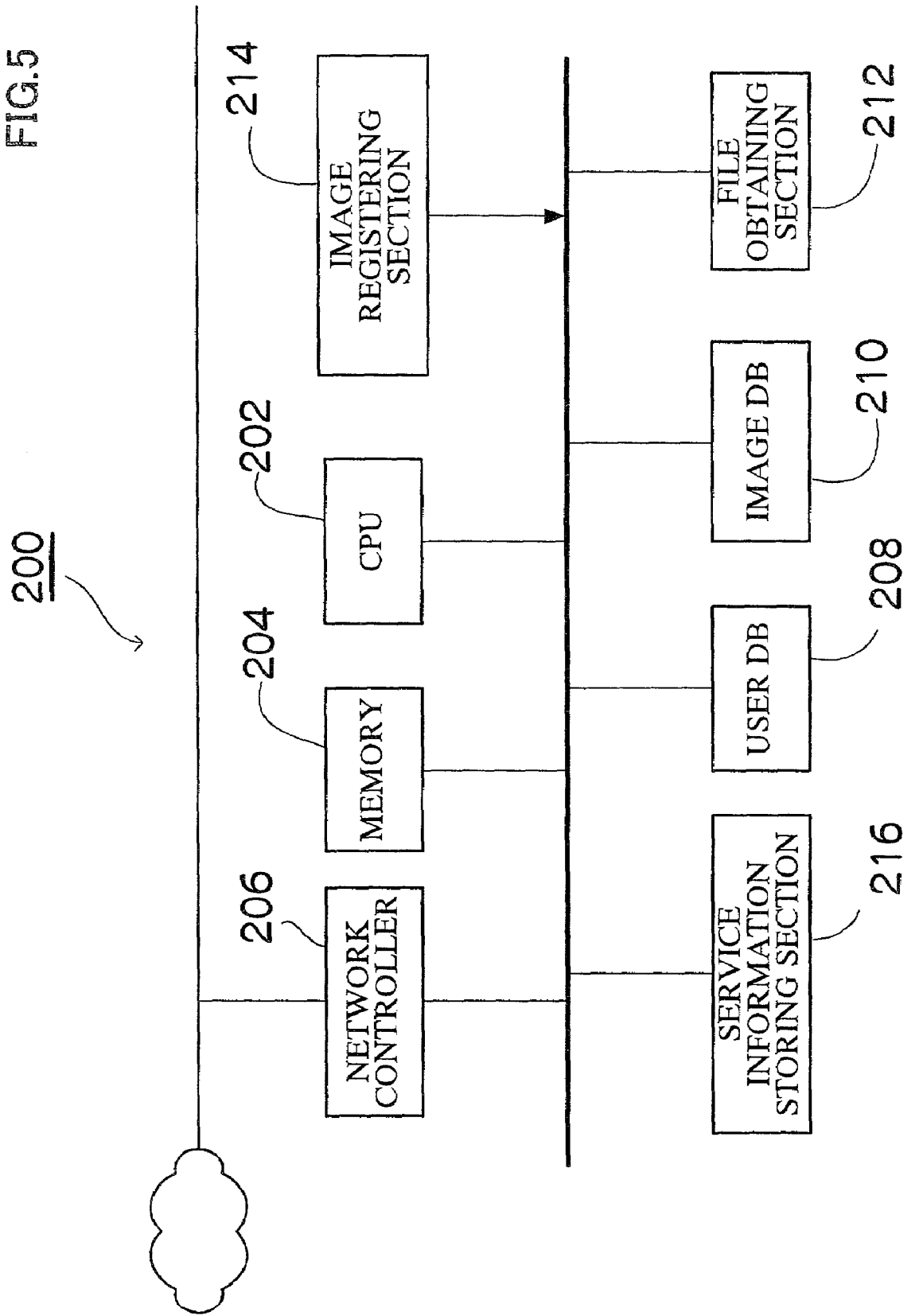

FIG.6

```
<service content = image storage>
    <maximum resolution>
        <vertical>1024</vertical>
        <horizontal>1280</horizontal>
    </maximum resolution>
    <minimum resolution>
        <vertical>240</vertical>
        <horizontal>320</horizontal>
    <minimum resolution>
    <maximum file size>
        1024kilobytes
    </maximum file size>
</service>
<service content = print service>
    <maximum resolution>
        <vertical>2048</vertical>
        <horizontal>3048</horizontal>
    </maximum resolution>
    <minimum resolution>
        <vertical>1024</vertical>
        <horizontal>1280</horizontal>
    </minimum resolution>
</service>
```

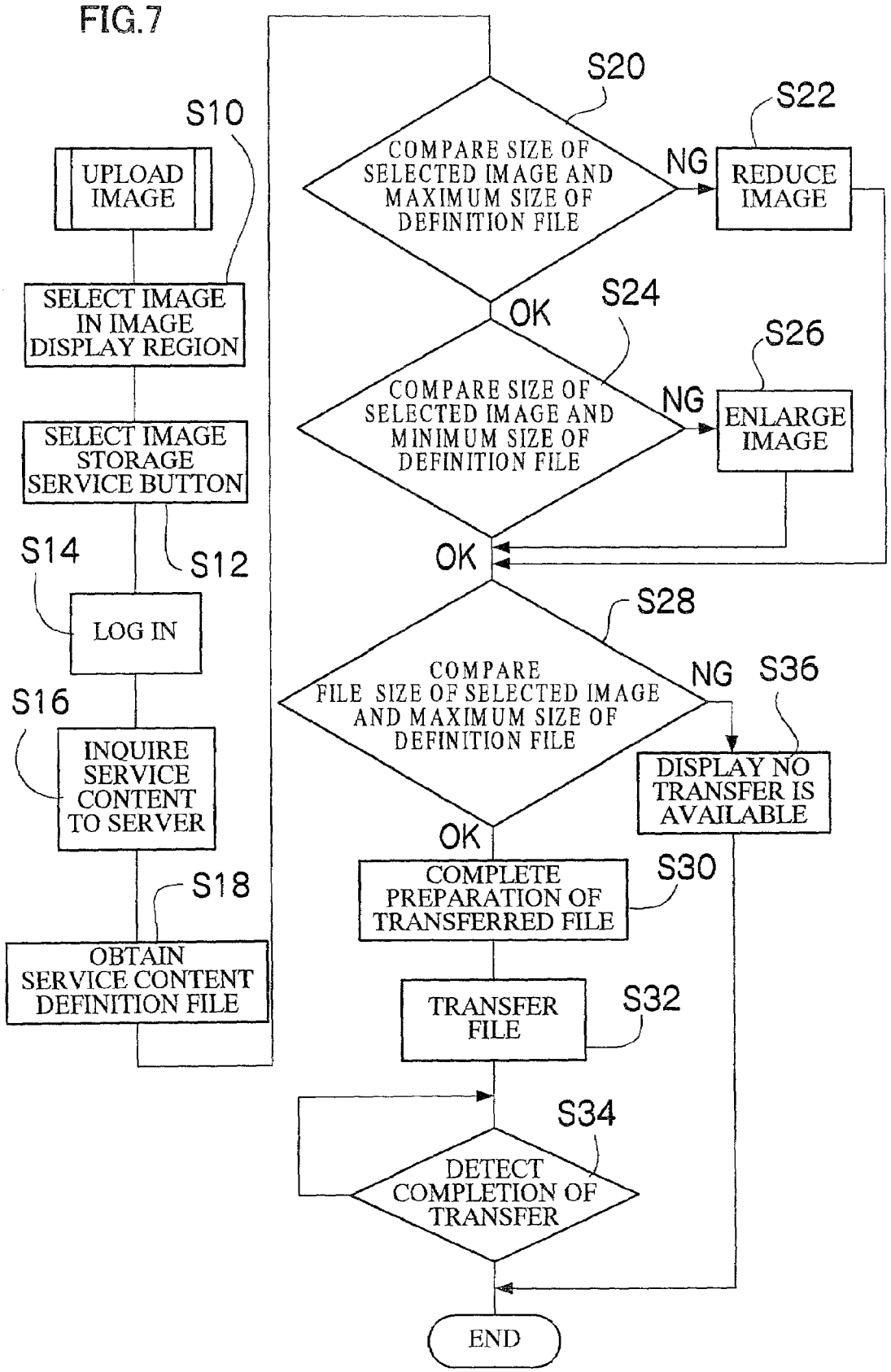

METHOD AND SYSTEM FOR TRANSMITTING IMAGE

BACKGROUND OF THE INVENTION

1. Field of the Invention

The present invention relates to a method and a system for transmitting an image, and particularly concerns a method and a system for transmitting an image whereby an image is uploaded to an image storage server, an image print server, and so on from a client computer.

2. Description of the Related Art

Conventionally, service has been provided for storing electronic data, which includes electronic documents such as documents of a word processor, a still image, a moving image, and, music data, in a server via a channel.

Further, an archive server provided on the Internet generally offers a certain capacity of a hard disk on the server to each member, and a user can freely use the capacity. On some image storing sites (archiving service) and so on, a user selects images taken by a digital camera, the selected image is freely uploaded and displayed like an album on a server or released on a public page.

However, as described above, a capacity available on an image storage server and the like is limited for a user. Unless the user deletes unnecessary images from uploaded images, the capacity reaches the limit soon and cannot be used due to the shortage.

Moreover, since some image storage servers process display on the side of servers, the following service is provided: the maximum image size is determined in advance, warning is issued for an image exceeding the maximum image size, the image is resized to the maximum image size or smaller before being uploaded. In this case, a user has to operate the resizing function provided in a digital camera and a client computer to resize an image to a smaller one before transmission. Thus, the operation becomes complicated.

SUMMARY OF THE INVENTION

The present invention has been developed in view of the above-mentioned circumstances, and has its object to provide a method and a system for transmitting an image whereby even when an image to be uploaded to a service server has an image specification unsuitable for image service of the service server, the image can be automatically transmitted to the service server, thereby reducing the load of a user.

In order to attain the above object, the present invention is directed to an image transmitting method for transmitting an image from a client computer to a service server, the method comprising: selecting the image to be transmitted; obtaining image information limited by a destination service server; determining whether the selected image has image information suitable for the limited image information; performing image processing such that image information of the selected image is suitable for the limited image information when the image information of the selected image is unsuitable for the limited image information; and transmitting the selected image to the service server without any processing when the selected image has image information suitable for the limited image information, and transmitting to the service server the selected image being subjected to image processing when the image information is unsuitable for the limited image information.

According to the present invention, when an image (selected image) transmitted to the service server from the client computer is limited by the service server, the image is automatically processed such that no limit is imposed, and then, the image is transmitted to the service server. Therefore, it is possible to automatically transmit an image not being limited by the service of the service server without a load on the user.

Preferably, the client computer inquires image information limited by the destination service server prior to transmission of the selected image, and the client computer obtains the limited image information from the service server. Thus, the client computer can respond even when the limited image information differs for each service server or when the image information limited by the service server is changed.

Preferably, the client computer starts predetermined image display programs to offer a list of images on a display, and the client computer displays a variety of menu buttons based on menu button information corresponding to various service servers; the image to be transmitted is selected from the list of images by using a pointing device; and a desired menu button is selected from the variety of menu buttons so that access is made to a service server corresponding to the selected menu button.

Preferably, the image information limited by the destination service server is included in menu button information corresponding to the service server. In this case, communication is not necessary for obtaining image information, which is limited by the service server, from the destination service server.

Preferably, the image information includes at least one of an image size, a file size, compressibility, an image format, and an image aspect ratio. For example, when the image size of the selected image is larger than the image size limited by the destination service server, the selected image is resized to the limited image size before transmission.

The present invention is also directed to an image transmitting system for transmitting an image from a client computer to a service server, the system comprising: the client computer comprising: an image selecting device which selects the image to be transmitted; an image information obtaining device which obtains image information limited by a destination service server; a determining device which determines whether image information of an image selected by the image selecting device is suitable for image information obtained by the image information obtaining device; an image processing device which processes the selected image such that image information of the selected image is suitable for the limited image information when image information of the selected image is unsuitable for the limited image information; and a device which transmits a selected image to the service server without any processing when image information of the selected image is suitable for the limited image information, and which transmits to the service server the selected image processed by the image processing device when the image information is unsuitable for the limited image information; and the service server comprising: an image information storing device which stores image information limited by the service server; a device which transmits image information stored in the image information storing device to the client computer in response to request for obtaining image information from the client computer; and a device which receives a selected image transmitted from the client computer and performs image service on the selected image.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 5 is a block diagram schematically showing the configuration of an image storage server shown in FIG. 1;

FIG. 6 is a diagram showing an example of a service content definition file;

FIG. 7 is a flowchart showing the steps of transmitting an image on the client computer.

DETAILED DESCRIPTION OF THE PREFERRED EMBODIMENTS

Hereunder preferred embodiments will be described in detail for a portable device, a mobile phone, an image transmission system, and a method of transmitting an image of the present invention in accordance with the accompanied drawings.

Figure 1:
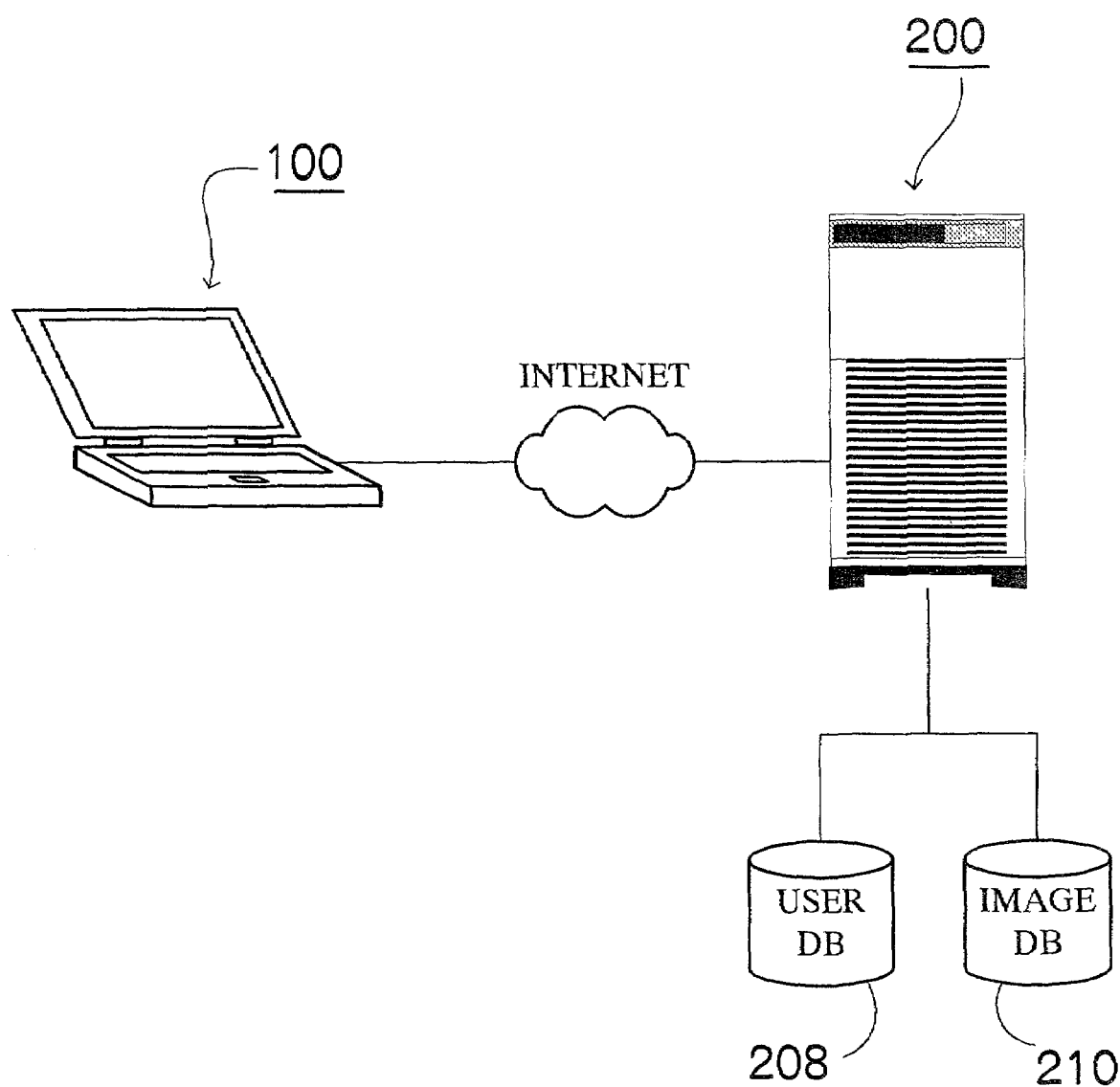
FIG. 1 is a schematic view showing an image transmission system of the present invention.

FIG. 1 is a schematic drawing showing the system for transmitting an image of the present invention. The image transmission system of FIG. 1 uploads an image via the Internet from a client computer 100 to a service server (image storage server in the present embodiment) 200 of a service provider who carries out various kinds of service.

Namely, the client computer 100 specifies the image storage server 200 on the Internet by using URL (Uniform Resource Locators), uploads to the image storage server 200 an image inputted via a digital camera (not shown), and the image storage server 200 provides service for storing the image.

Figure 2:
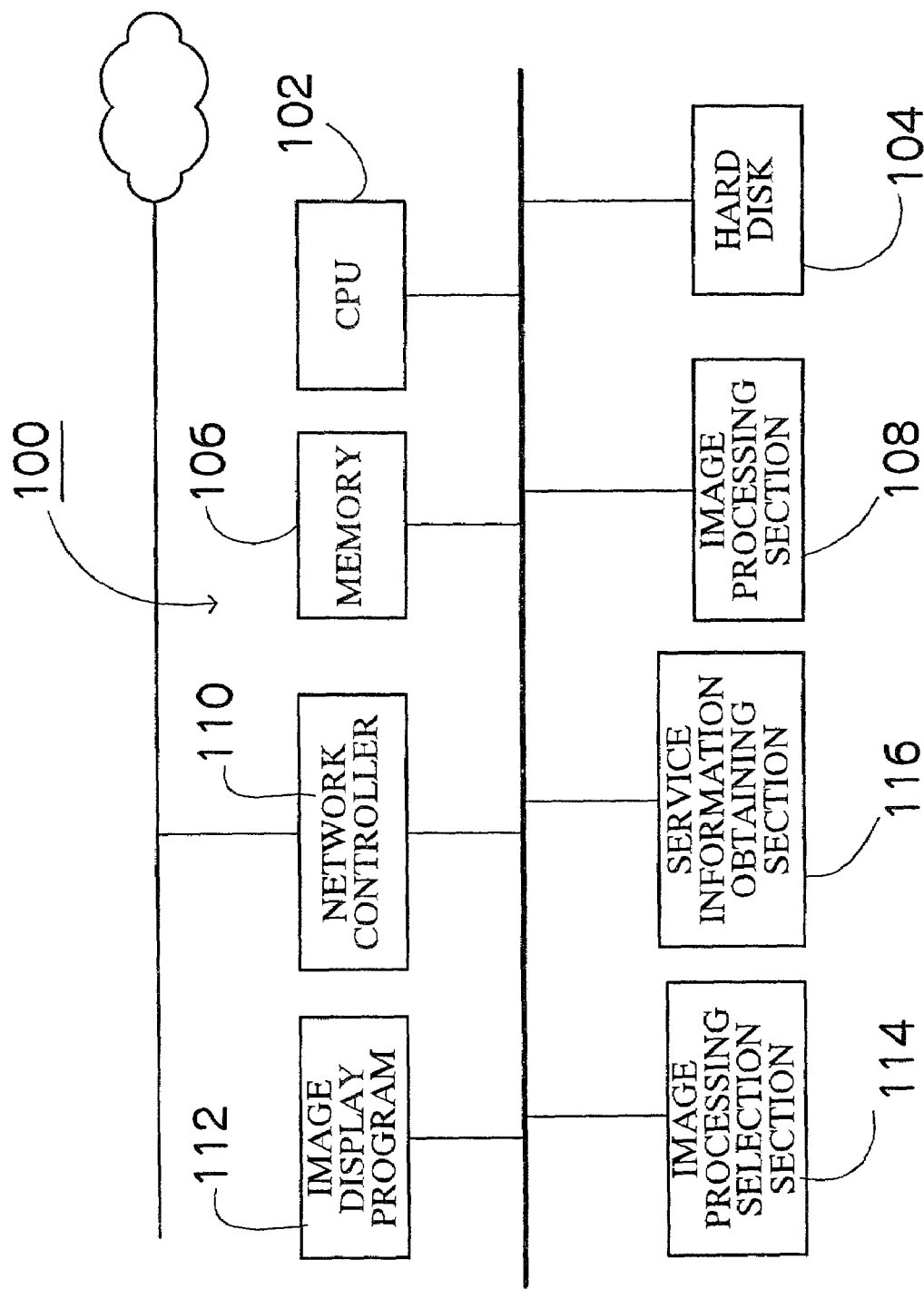
FIG. 2 is a block diagram schematically showing the configuration of a client computer shown in FIG. 1.

FIG. 2 is a block diagram schematically showing the configuration of the client computer 100. As shown in FIG. 2, the client computer 100 includes a central processing unit (CPU) 102 for entirely controlling a device, a hard disk 104 where programs for operating the CPU 102, images taken from a digital camera, and so on are written, a memory 106 composed of a ROM, in which various constants and so on are written, and RAM, which serves as a workspace when the CPU 102 performs processing, an image processing section 108 for processing an image so as to suitably change image information such as an image size (the number of pixels), a file size, compressibility, an image format, and an image aspect ratio, and a network controller 110 for making connection with the Internet to transmit and receive necessary information.

Moreover, the client computer 100 includes an image display program 112 for displaying a list of images stored in a memory card of a digital camera and images stored in the hard disk 104, an image processing selecting section 114 which selects an image to be transmitted to a service server and selects a destination service server, and a service information obtaining section 116 for obtaining a service content definition file including image information such as image size that is limited by a destination service server.

In the above client computer 100, when image display programs are started, a list of images is displayed on the display of the client computer 100.

Figure 3:
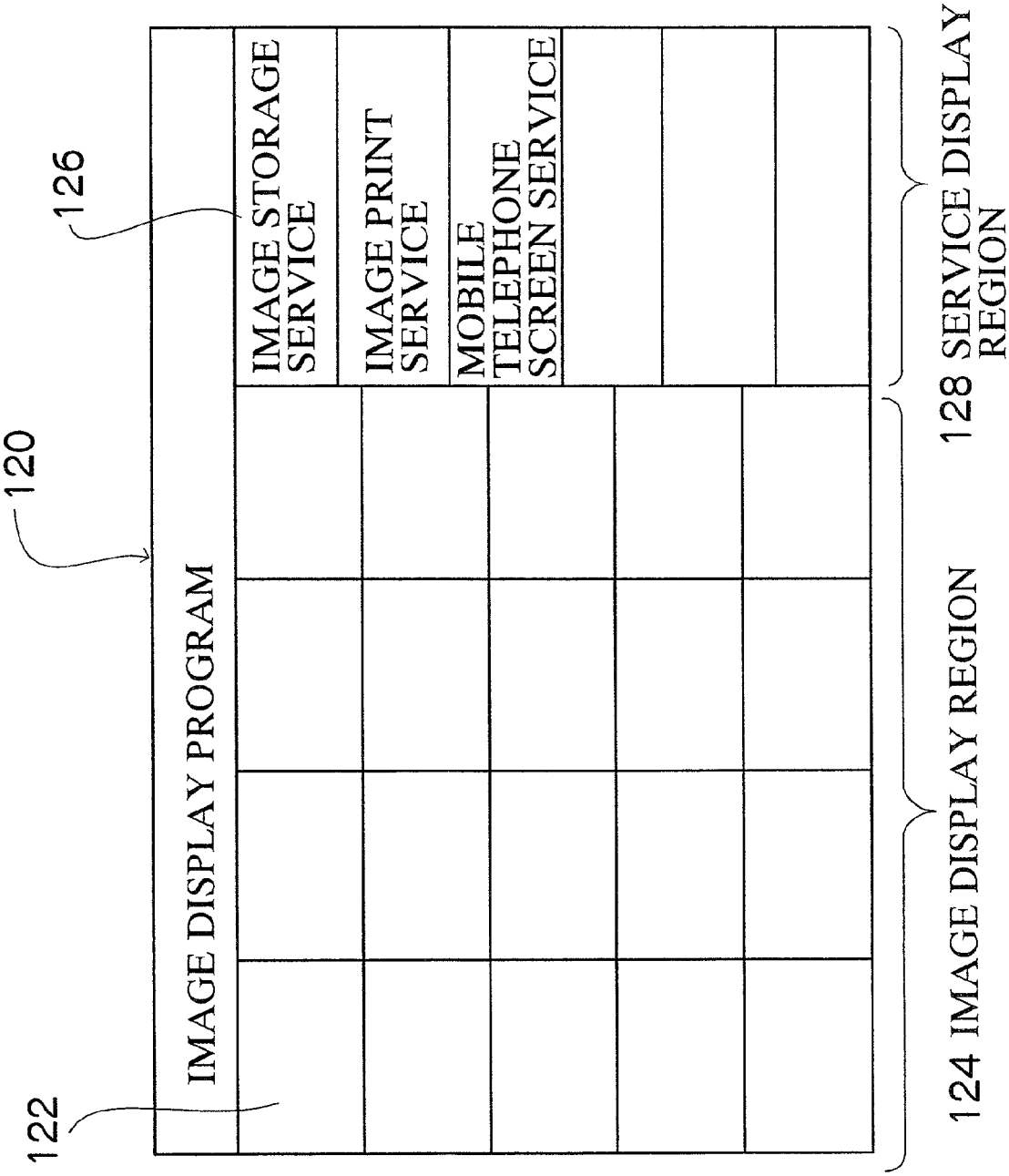
FIG. 3 is a diagram showing a screen of an image viewer that is provided on a display when image display programs of the client computer are started.

FIG. 3 shows a screen of an image viewer that is provided on the display when the image display programs are started.

A screen 120 provided by the image viewer includes an image display region 124, which displays a list of reduced images (thumbnail images) 122 of images stored in a folder specified by the user, and a service display region 128, which displays a list of menu buttons 126 indicating kinds of service.

The menu buttons 126 are link buttons for making connection to service servers. For example, service selection buttons are provided, which include an image storage service button, an image print service button, a mobile phone screen service button, a photo CD production service button, a photo releasing button, and a photo contest submitting button.

The user simply selects desired one to a plurality of images from a list of the reduced images 122 displayed on the image display region 124 by using a pointing device such as a mouse or an input device such as a key board (not shown), and clicks desired one of the menu buttons 126. Connection is made with a service server corresponding to the menu button 126, and the selected image can be uploaded to the service server.

Also, the screen 120 includes a menu update button (not shown). When a user clicks the menu update button as necessary, the user can have access to the menu server and obtain latest menu button information. The menu button information includes an ID of the service server, a URL of the site of the server, and a button image.

When an image storage service button 126 is pushed among the menu buttons displayed in a list on the screen 120, the screen 120 makes connection to the image storage server 200 (FIG. 1) by using an access method and a URL that are written in the menu button information of the button (for example, a browser is started to convey a URL of the image storage server 200 that is written in the menu button information).

Figure 4:
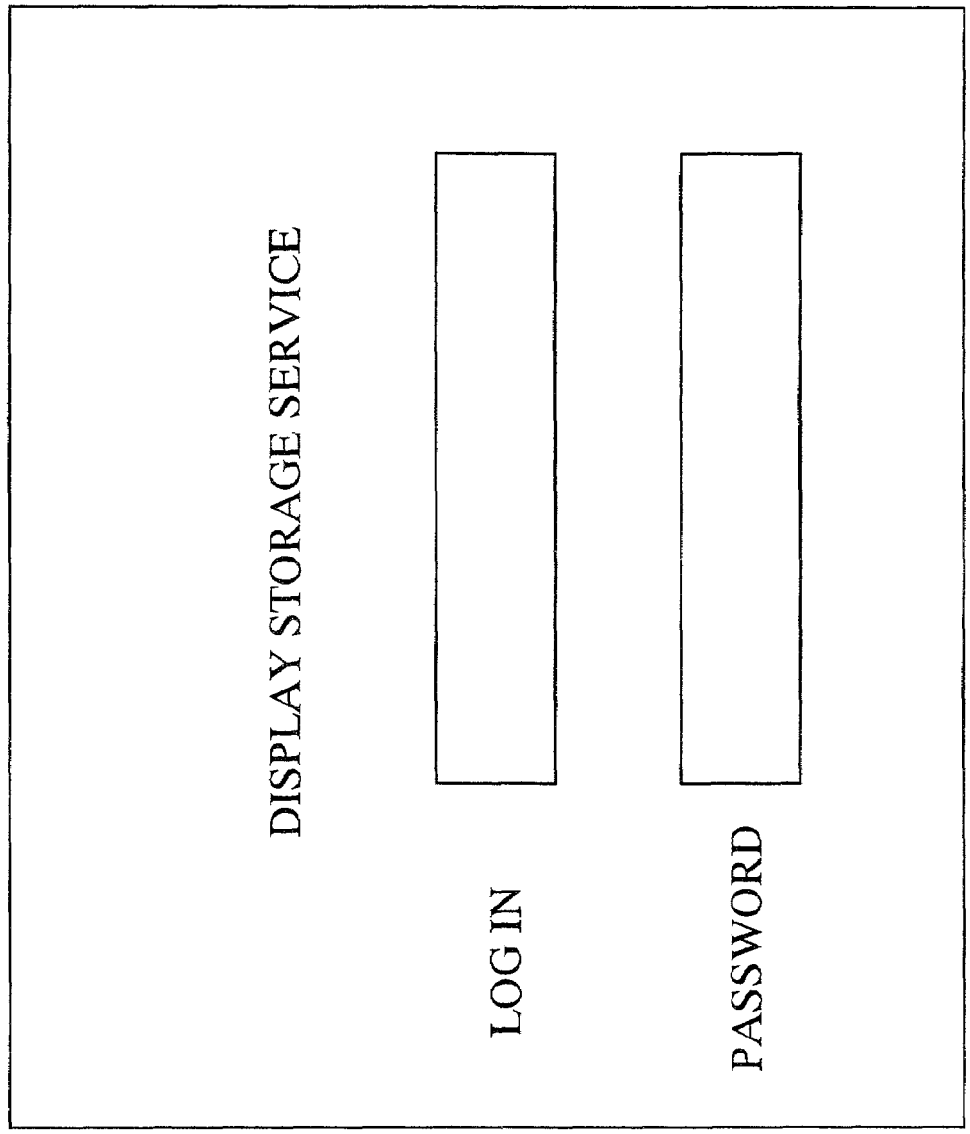
FIG. 4 is a diagram showing a log-in screen to a service server that is provided on the display of the client computer.

Thus, as shown in FIG. 4, a log-in screen to image storage service is displayed. Here, a log-in ID and a password are inputted and conveyed to the image storage server 200, so that log-in is made.

FIG. 5 is a block diagram schematically showing the configuration of the image storage server 200. As shown in FIG. 5, the image storage server 200 includes a CPU 202 for entirely controlling a device, a memory 204 composed of a ROM, in which programs for operating the CPU 202 and various constants are written, and RAM, which serves as a workspace when the CPU 202 performs processing, a network controller 206 for making connection with the Internet to transmit and receive necessary information, a user data base 208 for managing a user ID, a password, and so on, and an image data base 210 for storing and managing an image of a user.

Further, the image storage server 200 includes a file receiving section 212 for receiving an image file, an image registering section 214 for registering a received image file on the image data base 210, and a service information storing section 216 for storing a service content definition file including image information such as an image size that is limited by the image storage server 200.

FIG. 6 shows an example of the service content definition file, which is indicated in an XML (Extensible Markup Language) format.

The service content definition file of FIG. 6 indicates a service content (image storage service and print service) and image information (image size and file size in the present embodiment) limited by the service content. To be specific, when the service content is image storage service, a. maximum resolution is limited to 1024 vertical pixels and 1280 horizontal pixels, a minimum resolution is limited to 240 vertical pixels and 320 horizontal pixels, and a maximum file size is limited to 1024 kilobytes. Besides, when the service content is print service, a maximum resolution is limited to 2048 vertical pixels and 3048 horizontal pixels, a minimum resolution is limited to 1024 vertical pixels and 1280 horizontal pixels, and a maximum file size is not limited.

Additionally, in a definition file, in addition to the image file size and file size, compressibility, an image format, an image aspect ratio, and so on may be limited.

Figure 8:
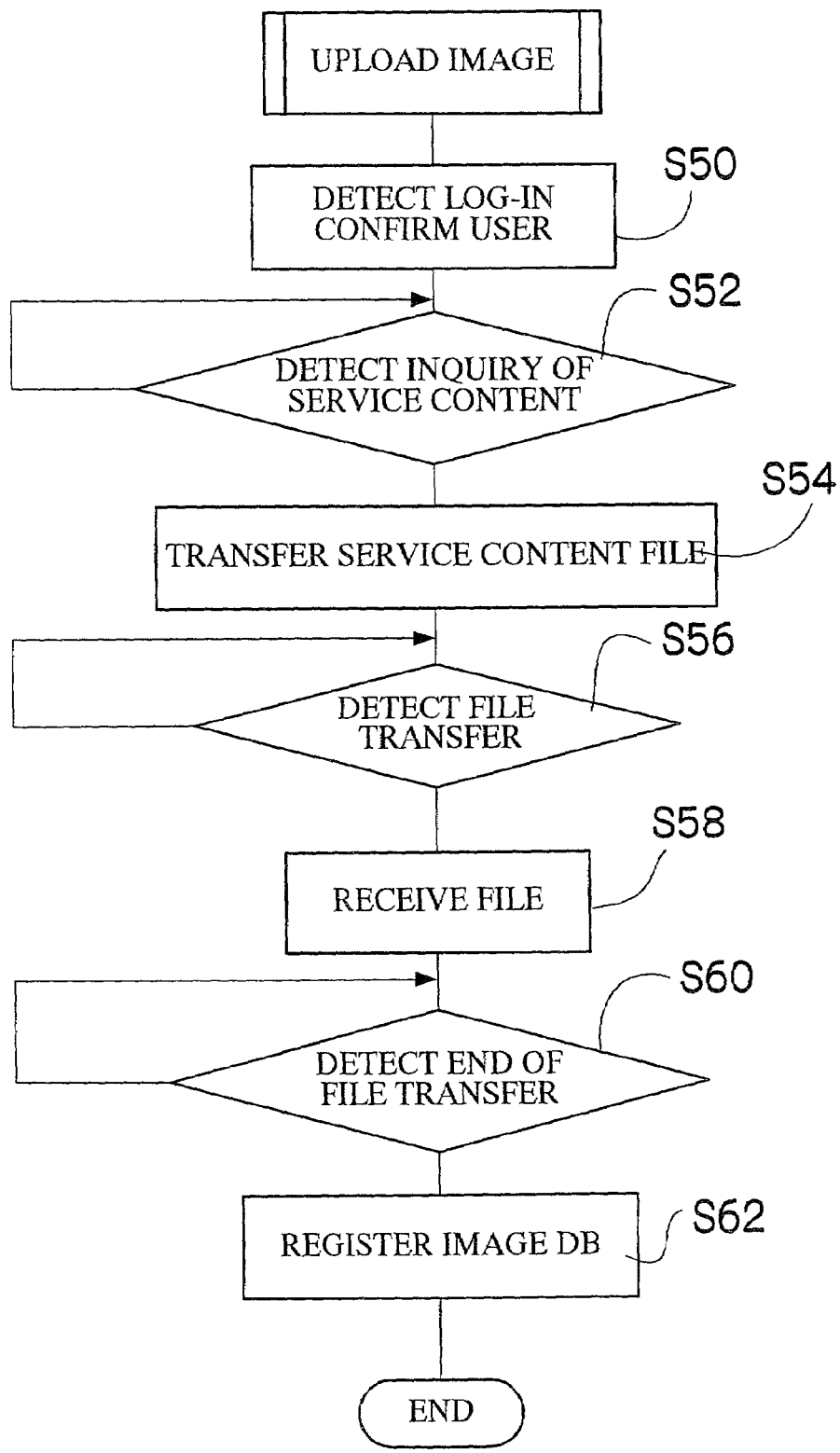
FIG. 8 is a flowchart showing the steps of receiving an image on the image storage server.

Next, the method of transmitting an image of the present invention will be discussed with reference to flowcharts of FIGS. 7 and 8. FIG. 7 shows the steps of the client computer 100, and FIG. 8 shows the steps of the image storage server 200.

In the client computer 100 of FIG. 7, image display programs are started to provide the screen 120 (FIG. 3) of the image viewer on the display of the client computer 100. The image display region 124 of the screen 120 displays a list of the reduced images 122 of images stored in a folder specified by a user. From the list of the reduced images 122 displayed on the image display region 124, the user selects an image on which image storage service is requested (step S10).

Subsequently, from menu buttons of various kinds of service that are displayed on the service display region 128 of the screen 120, an image storage service button 126 is selected in the present embodiment (step S12).

When the image storage service button 126 is selected, connection is made with the image storage server 200 corresponding to the image storage service button 126, and as shown in FIG. 4, the log-in screen to the image storage service is displayed. Here, a log-in ID and a password are inputted and transferred to the image storage server 200, so that log-in is made (step S14).

When log-in is made, the service content of the image storage server 200 is inquired (step S16), so that the service content definition file (FIG. 6) is obtained from the image storage server 200 (step S18).

Next, from the service content corresponding to the service (image storage service) selected by the user in the service content definition file, analysis is made on the content of a tag indicating the maximum resolution. And then, the size of the image selected in step S10 is compared with the maximum image size of the definition file (step S20). When the size of the selected image is larger than the maximum image size (in the case of NG), image processing is performed to reduce the size of the selected image (step S22), and then, the operation goes to step S28. Meanwhile, when the size of the selected image is equal to or smaller than the maximum image size (in the case of OK), the operation goes to step S24.

In step S24, the size of the selected image is compared with the minimum image size of the definition file. When the image size of the selected image is smaller than the minimum image size (in the case of NG), image processing is performed to increase the size of the selected image (step S26), and then, the operation goes to step S28. When the size of the selected image is equal to or larger than the minimum image size (in the case of OK), the operation goes to step S28.

In step S28, the file size of the selected image is compared with the maximum file size of the definition file. When the file size of the selected image is equal to or smaller than the maximum file size (in the case of OK), the file is transferred after preparation is completed for a file to be transferred (step S30 and step S32). Subsequently, when the end of transfer is detected (step S34), uploading of the image is completed.

Meanwhile, in step S28, when the file size of the selected image is larger than the maximum file size (in the case of NG), display is provided to notify the client computer that the file cannot be transferred (step S36), and the operation is ended without uploading the image. In the present embodiment, when the file size of the selected image is NG, transfer is not performed. Image processing may be performed before transfer such that the file size of the selected image is OK.

On the image storage server 200 of FIG. 8, the user is identified based on the user data base 208 by using the log-in ID and password that are transferred from the client computer 100 (step S50). Subsequently, when the inquiry of the service content is detected (step S52), a service content definition file stored in the service information storing section 216 is transferred to the client computer 100 (step S54). And then, when the start of transfer of an image file from the client computer 100 is detected, the image file is received (step S56 and step S58). When the end of transfer of the image file is detected, the received image file is registered in the image data base 210 and the operation is ended (step S60 and step S62).

Besides, in the present embodiment, the client computer obtains image information such as image size from the service server. The image information is limited by the service server. The present invention is not limited to the above example. Menu button information, which is distributed from the menu server when the menu is updated, may include image information limited by a service server corresponding to each menu button. In this case, communication is not necessary for obtaining image information, which is limited by the service server, from the destination service server.

As described above, according to the present invention, when an image is transmitted to the service server from the client computer, determination is automatically made whether the image has an image specification suitable for the image service of the destination service server (namely, whether the image is suitable for image information such as image size that is limited by the service server). When the image is not suitable, image processing such as resizing is automatically performed to have an image specification suitable for image service of the service server, and then, transmission is carried out. Thus, even when an image to be transmitted has an image specification unsuitable for image service of the destination service server, transmission can be automatically made to the service server. The user can use the service server without considering whether a transmitted image has an image specification suitable for the image service of the destination service server.

Moreover, for example, like mobile phone display service for providing a standby display of a mobile phone, when a transmitted image is larger than an image size requested by the image service, which is provided from the service server, the image size is reduced before transmission of the image.

Thus, the load of communication on the network can be reduced, thereby achieving lower cost of communication.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. An image transmitting method for transmitting an image from a client computer to a service server, the method comprising:
   enabling selection of the image to be transmitted;
   enabling selection of one of the plurality of menu buttons, wherein each of the plurality of menu buttons correspond to one of a plurality of service including an image storage service, an image print service, and a mobile phone service;
   enabling selection of a menu update button, which updates information associated with the plurality of menu buttons
   obtaining a service content definition file in which image information, limited by a destination service server, is included;
   determining whether the selected image has image information suitable for the limited image information;
   performing image processing such that image information of the selected image is suitable for the limited image information when the image information of the selected image is unsuitable for the limited image information; and
   transmitting the selected image to the service server without any processing by the client computer when the selected image has image information suitable for the limited image information, and transmitting to the service server the selected image being subjected to image processing when the image information is unsuitable for the limited image information, wherein the selected image is transmitted to the image server to perform the service of the selected one of the plurality of menu buttons.

2. The method of transmitting an image according to claim 1, wherein the image information includes at least one of an image size, a file size, compressibility, an image format, and an image aspect ratio.

3. The image transmitting method according to claim 1, wherein:
   the client computer starts predetermined image display programs to offer a list of images on a display; and the client computer displays the plurality of menu buttons based on menu button information corresponding to various service servers;
   the image to be transmitted is selected from the list of images by using a pointing device; and
   a desired menu button is selected from the plurality of menu buttons so that access is made to a service server corresponding to the selected menu button.

4. The method of transmitting an image according to claim 3, wherein the image information includes at least one of an image size, a file size, compressibility, an image format, and an image aspect ratio.

5. The image transmitting method according to claim 3, wherein the image information limited by the destination service server is included in menu button information corresponding to the service server.

6. The method of transmitting an image according to claim 5, wherein the image information includes at least one of an image size, a file size, compressibility, an image format, and an image aspect ratio.

7. The image transmitting method according to claim 1, wherein the client computer inquires image information limited by the destination service server prior to transmission of the selected image, and the client computer obtains the limited image information from the service server.

8. The method of transmitting an image according to claim 7, wherein the image information includes at least one of an image size, a file size, compressibility, an image format, and an image aspect ratio.

9. The image transmitting method according to claim 7, wherein:
   the client computer starts predetermined image display programs to offer a list of images on a display; and the client computer displays the plurality of menu buttons based on menu button information corresponding to various service servers;
   the image to be transmitted is selected from the list of images by using a pointing device; and
   a desired menu button is selected from the plurality of menu buttons so that access is made to a service server corresponding to the selected menu button.

10. The method of transmitting an image according to claim 9, wherein the image information includes at least one of an image size, a file size, compressibility, an image format, and an image aspect ratio.

11. The image transmitting method according to claim 9, wherein the image information limited by the destination service server is included in menu button information corresponding to the service server.

12. The method of transmitting an image according to claim 11, wherein the image information includes at least one of an image size, a file size, compressibility, an image format, and an image aspect ratio.

13. An image transmitting system for transmitting an image from a client computer to a service server, the system comprising:
   the client computer comprising:
   an image selecting device which enables selection of the image to be transmitted;
   a button selecting device which enables selection of one of the plurality of menu buttons, wherein each of the plurality of menu buttons correspond to one of a plurality of services including an image storage service, an image print service, and a mobile phone service;
   enabling selection of a menu update button, which updates information associated with the plurality of menu buttons;
   a service content definition file obtaining device which obtains a service content definition file in which image information, limited by a destination server, is included;
   a determining device which determines whether image information of an image selected by the image selecting device is suitable for image information obtained by the image information obtaining device;
   an image processing device which processes the selected image such that image information of the selected image is suitable for the limited image information when image information of the selected image is unsuitable for the limited image information; and
   a device which transmits a selected image to the service server without any processing by the client computer when image information of the selected image is suitable for the limited image information, and which transmits to the service server the selected image processed by the image processing device when the image information is unsuitable for the limited image information; and the service server comprising:

an image information storing device which stores image information limited by the service server;

a device which transmits image information stored in the image information storing device to the client computer in response to request for obtaining image information from the client computer; and a device which receives a selected image transmitted from the client computer and performs the image service, selected using the button selecting device, on the selected image.

14. The image transmitting system according to claim 13, wherein the image information includes at least one of an image size, a file size, compressibility, an image format, and an image aspect ratio.

15. An image transmitting method for transmitting an image from a client computer to a service server, the method comprising:

enabling selection of the image to be transmitted;

enabling selection of one of the plurality of menu buttons, wherein each of the plurality of menu buttons correspond to one of a plurality of service including an image storage service, an image print service, and a mobile phone service;

enabling selection of a menu update button, which updates information associated with the plurality of menu buttons obtaining a service content definition file in which image information, limited by a destination service server, is included;

determining whether the selected image has image information suitable for the limited image information;

performing image processing such that image information of the selected image is suitable for the limited image information when the image information of the selected image is unsuitable for the limited image information; and transmitting the selected image to the service server without any processing by the client computer when the selected image has image information suitable for the limited image information, and transmitting to the service server the selected image being subjected to image processing when the image information is unsuitable for the limited image information, wherein the selected image is transmitted to the image server to perform the service of the selected one of the plurality of menu buttons, wherein menu button information, which is distributed from the menu server when the menu is updated, includes image information limited by a service server corresponding to each menu button.

16. An image transmitting system for transmitting an image from a client computer to a service server, the system comprising:

the client computer comprising:

an image selecting device which enables selection of the image to be transmitted;

a button selecting device which enables selection of one of the plurality of menu buttons, wherein each of the plurality of menu buttons correspond to one of a plurality of services including an image storage service, an image print service, and a mobile phone service; enabling selection of a menu update button, which updates information associated with the plurality of menu buttons;

a service content definition file obtaining device which obtains a service content definition file in which image information, limited by a destination server, is included;

a determining device which determines whether image information of an image selected by the image selecting device is suitable for image information obtained by the image information obtaining device;

an image processing device which processes the selected image such that image information of the selected image is suitable for the limited image information when image information of the selected image is unsuitable for the limited image information; and a device which transmits a selected image to the service server without any processing by the client computer when image information of the selected image is suitable for the limited image information, and which transmits to the service server the selected image processed by the image processing device when the image information is unsuitable for the limited image information; and the service server comprising:

an image information storing device which stores image information limited by the service server;

a device which transmits image information stored in the image information storing device to the client computer in response to request for obtaining image information from the client computer; and a device which receives a selected image transmitted from the client computer and performs the image service, selected using the button selecting device, on the selected image, wherein menu button information, which is distributed from the menu server when the menu is updated, includes image information limited by a service server corresponding to each menu button.

* * * * *